US008706698B2

(12) United States Patent
Bachar et al.

(10) Patent No.: US 8,706,698 B2
(45) Date of Patent: Apr. 22, 2014

(54) COORDINATION OF EVENT LOGGING OPERATIONS AND LOG MANAGEMENT

(75) Inventors: Yariv Bachar, Kibbutz Ma'abarot (IL); Ron Edelstein, Tel Aviv (IL); Ehud Meiri, Dubin (IE)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/239,326

(22) Filed: Sep. 21, 2011

(65) Prior Publication Data

US 2013/0073532 A1     Mar. 21, 2013

(51) Int. Cl.
| | | |
|---|---|---|
| *G06F 7/00* | (2006.01) | |
| *G06F 17/00* | (2006.01) | |
| *G06F 12/00* | (2006.01) | |
| *G06F 17/30* | (2006.01) | |
| *G06F 11/14* | (2006.01) | |
| *G06F 7/32* | (2006.01) | |

(52) U.S. Cl.
CPC ...... *G06F 11/1461* (2013.01); *G06F 17/30067* (2013.01); *G06F 17/30008* (2013.01); *G06F 17/30286* (2013.01); *G06F 7/32* (2013.01)
USPC ............................ 707/661; 707/640; 707/825

(58) Field of Classification Search
CPC .......... G06F 11/1461; G06F 17/30067; G06F 17/30068; G06F 17/30286
USPC ........................................ 707/640, 661, 825
See application file for complete search history.

(56) References Cited

U.S. PATENT DOCUMENTS

| | | | | |
|---|---|---|---|---|
| 6,539,341 | B1 * | 3/2003 | Khandelwal et al. | ......... 702/187 |
| 7,613,743 | B1 * | 11/2009 | Giampaolo et al. | ................. 1/1 |
| 2009/0276470 | A1 * | 11/2009 | Vijayarajan et al. | .......... 707/202 |

OTHER PUBLICATIONS

"Stream Buffering." GNU C Programming Tutorial. Online, Nov. 13, 2003. 1 page.*

* cited by examiner

*Primary Examiner* — Charles Lu
(74) *Attorney, Agent, or Firm* — Griffiths & Seaton PLLC

(57) ABSTRACT

A plurality of log processes are synchronized. Each is independently performed in parallel with one another, into a single set of log files. A line buffering mechanism of an operating system (OS) of the computing environment forecloses interleaving of the log processes. Log management operations are concurrently performed by a single process protected by a file-system lock of the OS. The log management operations include at least one of a log compression, log retention, and log rotation operation.

12 Claims, 9 Drawing Sheets

APPLICATION_NAME__2011_02_06__001.LOG

BASENAME / LAST SCHEDULE-BASED ROTATION TIME / LOG NO.

TARGET ARCHIVE SIZE = [(MAX ARCHIVE SIZE) x (TARGET ARCHIVE SIZE FACTOR)] + (RETENTION SAFETY INTERVAL)

COORDINATION OF EVENT LOGGING OPERATIONS AND LOG MANAGEMENT

BACKGROUND OF THE INVENTION

1. Field of the Invention

The present invention relates in general to computers, and more particularly coordination of event logging operations and log management by a processor device in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

SUMMARY OF THE DESCRIBED EMBODIMENTS

Logging mechanisms are essential to the operation of any system. As systems (and software) may fail, it is important to be able to diagnose and/or isolate the root causes. Regardless of the system or software used, the system log is fundamental as a diagnostic information source.

Logging mechanisms provide information on how the system/software is working. Without these mechanisms, when the system encounters unexpected errors, users can experience excessive downtime due to the lack of diagnostic data. With properly configured and detailed logging, one can capture such diagnostic information, which may be used for many purposes (e.g. administration, debugging problems, pro-active system/problem analysis etc.).

Log management presents several challenges, all having a common core problem: efficiently balancing limited log management resources vs. growing stream of logged data. Specifically, most systems maintain multiple log files per host, and the number of logs can be quite high. Moreover, many logs capture large data volumes on a daily basis, so the total daily volume of log data generated by the system is usually voluminous. This affects the resources required to store the logged data for the proper time length. In addition, sometimes the availability of the logs must be maintained. Many logs have a maximum size (e.g. X most recent events, or Y megabytes of log data). When this size limit is reached, the log might overwrite old data with new data, which harms the log data availability. To meet log retention requirements, systems need to keep copies of log files for a longer period of time than the original log sources can support, which necessitates establishing log archival processes. Because of logs' volume, it might be appropriate, in some cases, to reduce the logs by filtering less important log entries or compressing older logs to an archive. A need exists for mechanisms to more effectively perform and coordinate log management and logging operations.

Accordingly and in view of the foregoing, various exemplary method, system, and computer program product embodiments for coordination of event logging operations and log management, are provided. In one embodiment, by way of example only, a plurality of log processes are synchronized. Each is independently performed in parallel with one another, into a single set of log files. A line buffering mechanism of an operating system (OS) of the computing environment forecloses interleaving of the log processes. Log management operations are concurrently performed by a single process protected by a file-system lock of the OS. The log management operations include at least one of a log compression, log retention, and log rotation operation.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
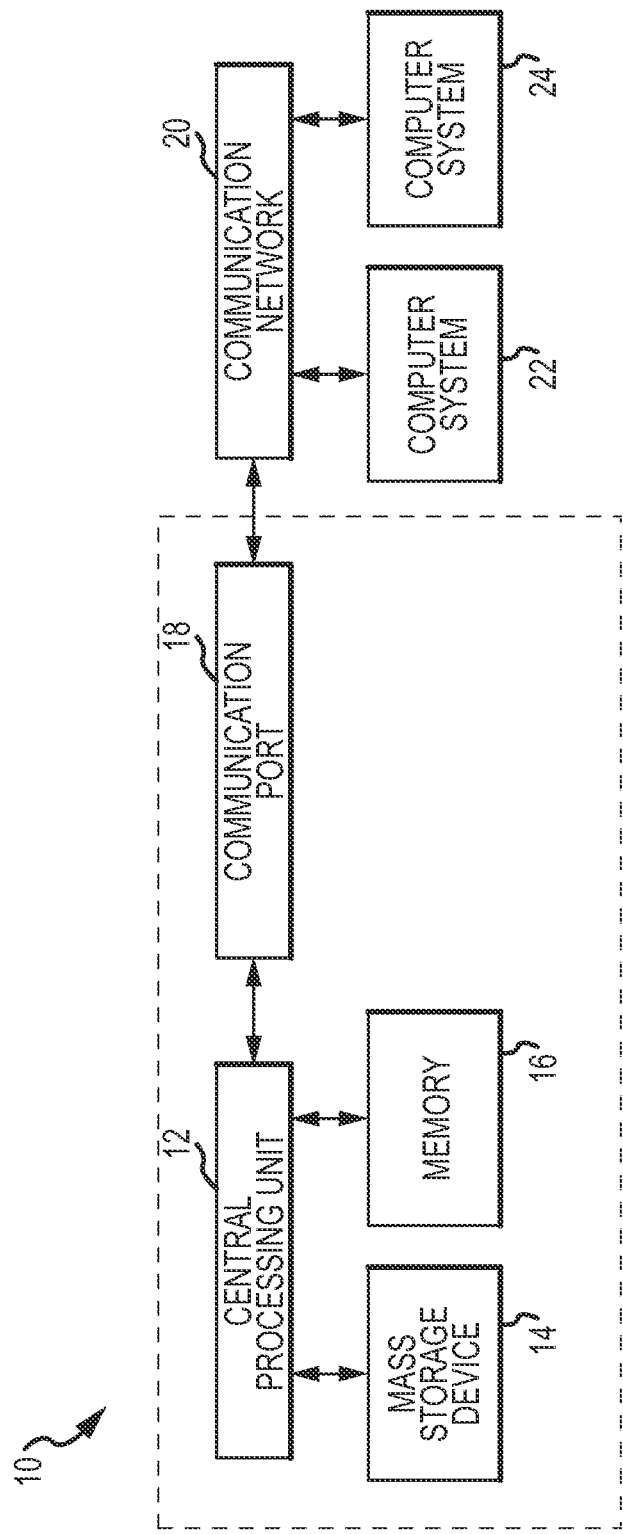
FIG. 1 illustrates a computing environment in which aspects of the present invention may be realized, keeping in mind that aspects of the invention may be realized on a variety of systems.

Log management usually supports several high level functions in order to achieve efficient logs' storage, analysis, and disposal. Amongst these are the following:

(1) Log parsing—extracting log data such that the parsed values can be used as input for another logging process. Parsing is executed as part of other logging functions, such as log conversion and log viewing.

(2) Event filtering—log entries' suppression during analysis, reporting, or long-term storage due to criteria that indicates they are unlikely to contain information of interest (e.g. duplicate entries or informational entries might be filtered).

(3) Event aggregation—similar entries are consolidated into a single entry including a count of the number of occurrences of the event. Aggregation can be carried out as logs are originally generated and it can also be carried out as part of log reduction or event correlation processes.

(4) Log rotation—closing a log file and opening a new log file when the first file is considered to be complete. Log rotation is typically performed according to a schedule (e.g. daily, weekly) or when a log file reaches a certain size. The primary benefits are preserving log entries and keeping the log files' size manageable. When a log is rotated, the preserved log can also be compressed to save space.

(5) Log archival—retaining logs for an extended period of time, typically on removable media, a storage area network (SAN), or a specialized log archival appliance or server. Logs often need to be preserved to meet legal or regulatory requirements. There are two types: retention (archiving logs on a regular basis as part of standard operational activities) and preservation (keeping logs that normally would be discarded, because they contain records of activity of particular interest, typically performed in support of incident handling or investigations).

(6) Log compression—storing a log file in a way that reduces the storage space needed for it without altering the meaning of its contents. Log compression is often performed when logs are rotated or archived.

(7) Log reduction—removing unneeded entries from a log to create a smaller new log. Similarly, event reduction removes unneeded data fields from all log entries. Log and event reduction are often performed in conjunction with log archival so that only the log entries and data fields of interest are stored in long-term storage.

(8) Log conversion—parsing a log in one format and storing its entries in another format. Log conversion sometimes includes actions such as filtering, aggregation, and normalization.

(9) Log normalization—conversion of each log data field to a particular data representation and for consistent categorization. One of the most common uses of normalization is storing dates and times in a single format. Normalizing the data makes analysis and reporting much easier when multiple log formats are in use. However, normalization can be very resource-intensive, especially for complex log entries.

(10) Log file integrity checking—involves calculating a message digest for each file and storing the message digest securely to ensure integrity.

(11) Log clearing—removing all entries from a log that precede certain date and time. Log clearing is often performed to remove old log data that is no longer needed on a system because it is not of importance or it has been archived.

In context of log management infrastructures, the system may require the logging functions described above to operate in a multi-process safe environment. In other words, performing logging functions from multiple processes, which comprise the same system, into a single log file. This may entail inherent race conditions and synchronization challenges which negatively affect performance and coherency of the logged data. Moreover, in some systems, it may not be feasible to introduce a separate stand-alone process or service, responsible solely for the logging management functions, but rather perform these functions cooperatively and inline within the processes running the system.

The standard log rotation mechanisms—logrotate or newsyslog, sometimes referred to as the "hindsight conveyer belt" log rotation mechanisms, suffer from several other deficiencies. Their usual manner involves a needless extra process (e.g. logrotate) issuing a 'rename' call, and on a busy system, a delayed signal to the logging process, to carry out the multiple system calls necessary to reopen the log file. Assuming the logging process is not able to catch and handle the signal, logging will continue to write to the log.0 rotated file (e.g. the current active log file). At worst, the rotated log might eventually be unlinked when it falls off the 'rename' conveyer belt, while the logging still continues to the file handle opened against the now unlinked inode. This may, given time, fill up the disk, or result in lost logs should the process exit or the system restart. A better system would not utilize the external process, and instead have the logging processes handle log rotation themselves.

Backup or file synchronization software such as rsync will infinitely backup all the log files following each rotation, as the renames will have changed the contents of all the named log files. Worse, they see the same filenames, but must scan through every file on both sides of the copy each time, looking for differences between the utterly different files. If log files are instead saved out into schedule-based templates, these software mechanisms will find and backup only the differences. The same benefit applies to processing or mining older logs for data: in a sliding conveyer belt scheme, the mining software would need to checksum the contents of each log, and then compare the checksum of the random log.N against a table of prior checksums to distinguish seen logs from unseen logs. Schedule-based logging, on the other hand, offers the filename as a unique identifier of whether a file has been seen, a much simpler and less computationally expensive means to determine whether a file has been processed.

Moreover, in schedule-based rotation, tracking down an old log file entry is not a time consuming task, as the location of old log entries would always reside in the same file, narrowing the scope of any scanning required. In other words, it is not trivial to calculate where a specific log entry will be located at any point in time under traditional log file rotation, without knowing the particulars of the log rotation implementation and configuration, and whether the system has been running or log rotation actually working.

An efficient synchronized log featuring compression, retention and rotation, in a multi-process environment should satisfy the following requirements:

(1) Operate in a multi-process environment and support synchronization (atomicity) between parallel (and even distributed) processes which all log into a single set of files. In other words, each log message is written atomically to the log files, in a non-interleaving manner.

(2) Perform logging of a single record entry in a lightweight fashion and avoid bottlenecks with the log management functions, optionally arising from a single log record entry. In other words, it is unacceptable that the logging operations and management functions shall be mutual exclusive.

(3) Provide log rotation function, supporting both schedule-based and size-based rotation.

(4) Support log archival functions with retention and compression within standard mode of operation.

(5) Enable the above logging functions inline to the logging devices and/or processes. In other words, not dependent on a stand-alone, external process which is solely responsible for the log management functions.

With the foregoing in mind, the illustrated embodiments present a novel approach for synchronized log compression, retention and rotation, satisfying all requirements described previously. These embodiments enable, for example, synchronized log management infrastructure, operating in a multi-process environment without bottleneck to the logging processes, providing schedule-based and size-based log rotation, supporting log retention and compression, and independent of any other external process or service for these features.

Throughout the following description and claimed subject matter, the following terminology, pertaining to the illustrated embodiments, is described. The definitions may form a table of suitable of definitions, form matrices for suitable purposes if needed, and for certain terms used herein.

(1) Max log file size may refer to herein as a maximum size limit for each individual log file. Log files are rotated at least based on a schedule (e.g. daily, weekly) or when they reach this maximum log file size. This reflects the size-based rotation.

(2) Schedule-based rotation interval may refer to herein as the maximum time between schedule-based log file rotations. A file is rotated if the time since the last schedule-based rotation has exceeded this interval.

(3) Log archive directory may refer to herein as the directory, in which the log files shall be created, rotated, compressed and archived.

(4) Max archive size may refer to herein as a maximum size limit for the entire log archive.

(5) Log file size rotation threshold may refer to herein as the minimum current log file size threshold for rotating the previous log file. The previous log file shall not be rotated until the current log file reaches this threshold size. It is also used for adhering to the maximum archive size limit of the mechanism.

(6) Line buffering may refer to herein as buffering strategy in which characters are transmitted to the file in blocks whenever a newline character is encountered. When applied to a logging mechanism, this ensures that each log line will be completely and atomically written to the log file.

Turning now to FIG. 1, exemplary architecture 10 of a computing environment in which aspects of the present invention may be implemented is depicted. Computer system 10 includes central processing unit (CPU) 12, which is connected to mass storage device(s) 14 and memory device 16. Mass storage devices may include hard disk drive (HDD) devices, solid state devices (SSD) etc., which may be configured in a redundant array of independent disks (RAID). The logging and log management operations further described may be executed on device(s) 12, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 may be connected through communication port 18 to a communication network 20, having an attached plurality of additional computer systems 22 and 24.

Figure 2:
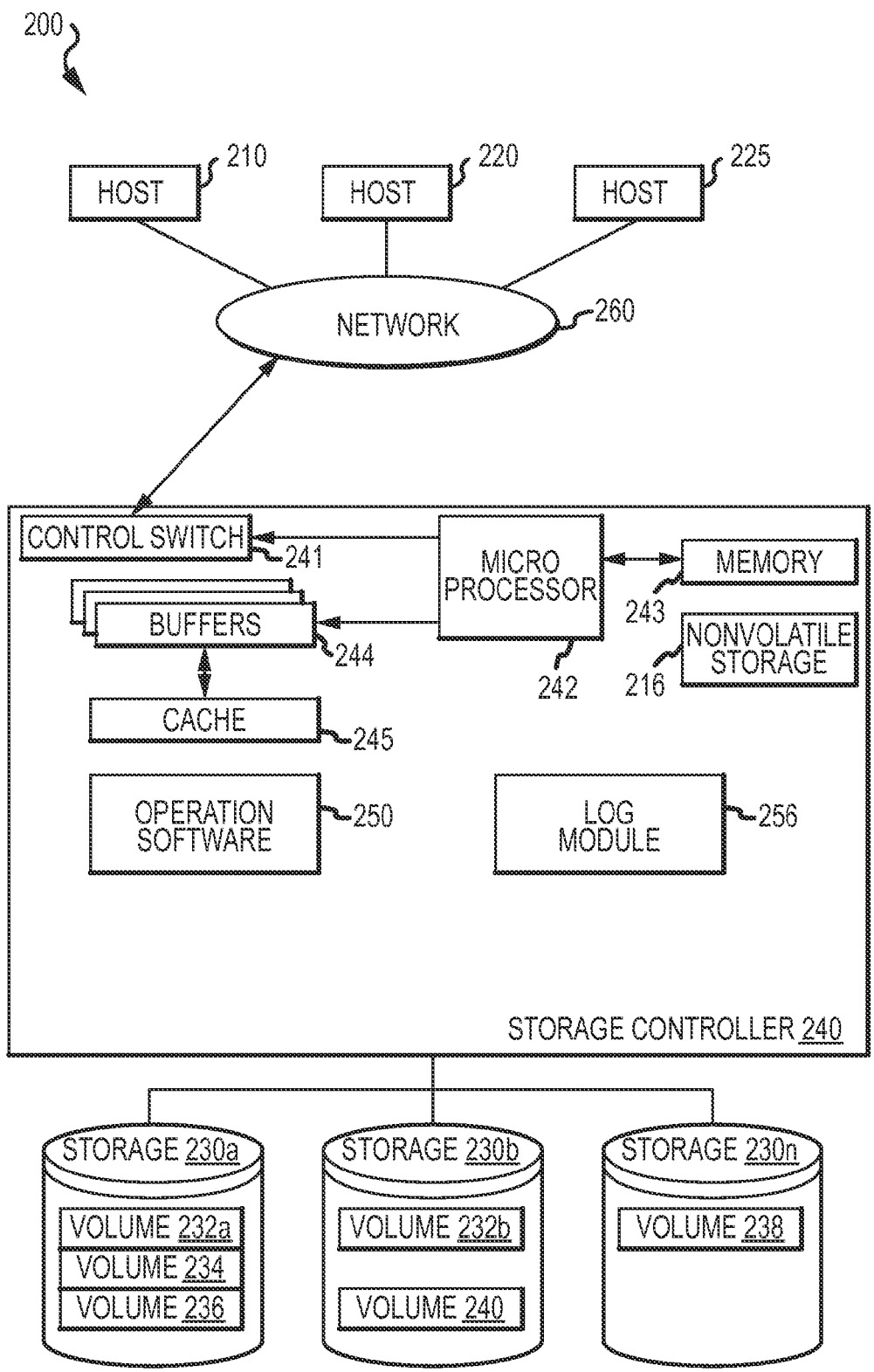
FIG. 2 illustrates an exemplary block diagram showing a hardware structure of a data storage system in which aspects of the present invention may be realized, again keeping in mind that aspects of the invention may be realized on a variety of systems.

FIG. 2 is a block diagram showing an additional embodiment of a computer system 200, again in which aspects of the present invention may be implemented, while again it should be noted that the logging and log management operations may be performed in a large variety of scenarios and using various systems and hardware. In the present embodiment, a storage sub-system including a storage controller is depicted and described, but is not intended to limit the scope of the present invention. Referring to FIG. 2, there are shown host computers 210, 220, 225, each acting as a central processing unit for performing data processing a part of system 200. The hosts (physical or virtual devices), 210, 220, and 225 may be one or more new physical devices or logical devices to accomplish the purposes of the present invention. In one embodiment, by way of example only, system 200 may be implemented as an IBM® System Storage™ DS8000™. Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240 via a control switch 241, such as Fibre channel, FICON, ESCON, Ethernet, fiber optic, wireless, or coaxial adapters. System 200 is accordingly equipped with a suitable fabric (not shown in FIG. 2) or network adapter 260 to communicate.

To facilitate a clearer understanding of the methods described herein, in one exemplary embodiment, a storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data. In one embodiment, system memory 243 includes, is associated, or is in communication with the operation software 250 which may be adapted to perform the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein. Storage controller 240 may also specifically include a log module 256 as shown, which may be configured to perform mechanisms described in the illustrated embodiments in furtherance of the present invention, either by itself or in conjunction with microprocessor 242 and operation software 250.

In some embodiments, cache 245 may be implemented with a volatile memory and non-volatile memory and coupled to microprocessor 242 via a local bus (not shown in FIG. 2) for enhanced performance system 200. The NVS 216 included in data storage controller may be accessible by microprocessor 242 and serves to provide additional support for operations and execution of the present invention as described in other figures. The NVS 216, may also referred to as a "persistent" cache, or "cache memory" and may be implemented with nonvolatile memory that may or may not utilize external power to retain data stored therein. The NVS 216 may be stored in and with the cache 245 for any purposes suited to accomplish the objectives of the present invention.

Storage 230 may be physically comprised of one or more storage devices, such as storage arrays. A storage array may be a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 may be allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

Logging is performed by each process separately, i.e. without a centralized logging process. The atomicity of operations is achieved by utilizing various mechanisms associated, in one embodiment, with an operating system. In one embodiment, actual line logging is protected by a line buffering mechanism associated with the operating system, which ensures that different log lines will not interleave, while the log management operations are protected by a file-system lock, which ensures that no two different processes will attempt to perform management operations at the same time. Accordingly, the protection of writing log entries is separated from the protection of performing log-management operations, and thus multiple processes may insert new entries into the log file while a single process is performing log-management operations.

The log-rotation mechanism is both size-based and schedule-based. New log files will be created when either the current log file size has exceeded max log file size or when the time since the last rotation has exceeded the schedule-based rotation interval (e.g. start of a new day when the interval is 24 hours). The mechanism also implements compression and size-based retention, i.e. all old log files are compressed, and once the entire log archive size exceeds max archive size, old logs shall be deleted.

When a new log-file is opened, it is given its final name, i.e. the log-file will not be renamed during its lifetime. This prevents the "hindsight conveyer-belt" disadvantages that were previously described. In the illustrated embodiments, two considerations are addressed when using a constant log-file approach. First, if two processes determine, at the same time, that a new log file should be opened, only one of them may actually create the file. This issue is resolved by using an option of the operating system's open-file method, which allows trying to create a new file and return whether or not it already exists in a single atomic operation. This way, both processes may attempt to create the new log file, but it is guaranteed that only one of them will actually succeed.

Second, once a process determines that a new log file should be created, all of the other processes should start writing to the new file. The retention mechanism must not compress or delete the previous log file until that happens. This issue is resolved by introducing a rotation threshold: The previous log file will not be compressed or deleted as long as the current log file's size has not exceeded this threshold, e.g. a percentage of the file's maximum size. The rationale is that by the time the new log file has reached a certain size, most of the processes have already started to write to the new file. Those that didn't will move to the new file once they try to perform a write, due to the size-based or schedule-based limits, which might have been inconclusive at the time of the rotation, is much more conclusive after the current log file exceeded the rotation threshold.

Accordingly, the mechanisms of the illustrated embodiments enable to achieve synchronized log file compression, retention and rotation, satisfying the comprehensive set of requirements below, and by this improving existing approaches discussed previously.

(1) The logging is performed by multiple parallel processes, into a single set of files, in a non-interleaving and atomic fashion.

(2) The logging of a single record entry is performed lightweight while avoiding bottlenecks (not mutually exclusive) with the log management functions, which derive once in a while, from single record entry logging.

(3) The mechanism offers both a schedule-based and size-based log rotation function.

(4) The mechanism provides log retention and compression functions inline within the standard mode of operation.

(5) Finally, the mechanism is independent of a stand-alone, external process for log management functions. On the contrary, all of the above log management functions are inline to the logging devices and/or processes.

In the following description as applied to functionality for performing synchronized log compression, retention and rotation, the following terminology is also used herein as follows:

(1) Basename may be used herein to refer to the log files' basename, which remains constant. It serves as the static portion of the rotated log files' filename, which can differentiate between log files of various applications which all have instance of the logging mechanism.

(2) Current log file number may be used herein to refer to the instance number of the current log file which is active. This number is incorporated in the rotated log filenames. It is reset to zero value once the mechanism has determined that a schedule-based rotation has occurred, and is incremented in each intermediate size-based rotation.

(3) Last schedule-based rotation time may be used herein to refer to the time in which the last schedule-based rotation took place. It is used together with schedule-based rotation interval to determine, during the logging of a new message entry, if a rotation is needed based on schedule. In other words, if the time since the last schedule-based rotation has exceeded the schedule-based rotation interval at the time the new entry was logged, this serves as a trigger to rotate, or should we say close the current log file and open a new one. In this case, the size-based rotation number is reset.

(4) Target archive size factor may be used herein to refer to the target size for the archive after logs are cleaned up, a factor of the max archive size discussed previously. The clean up is performed after the size exceeds max archive size. This factor should reflect a fraction of the max archive size.

(5) Retention safety interval may be used herein to refer to additional amount of old log data to be removed in the retention process in order to fully comply with the log archive maximum size threshold.

(6) Current log file pointer may be used herein to refer to the underlying file-system's pointer to the current log file that is active. It is used to access, query, check size and existence, and write to the underlying file-system files representing the log files. It also serves as an indication to whether the current log file is opened.

Figures 3, 4:
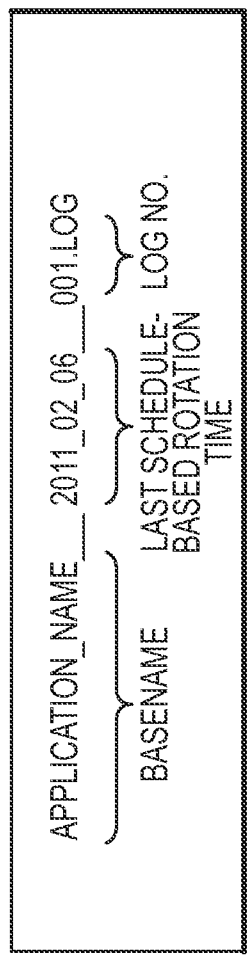
FIG. 3 illustrates an exemplary log filename.
FIG. 4 is an exemplary calculation of a target archive size parameter.

In view of the foregoing, in one embodiment, a log filename is comprised of the basename, its last schedule-based rotation time and current log file number. An example is illustrated in FIG. 3, following. All of these attributes do not change throughout the lifetime of the log file, and thus the file is never renamed (unless it is compressed, in which case it is appended a compression suffix, e.g. ".gz"). This strategy prevents the "hindsight conveyer-belt" disadvantages, but introduces new issues that are resolved, among others, by exercising a log file size rotation threshold, as previously described.

Old log files are compressed and stored until the entire log-archive directory reaches the max archive size threshold. After this threshold is reached, old logs are deleted until the entire archive size is less than the size derived from the target archive size factor and retention safety interval as shown in FIG. 4, following. This ensures sufficient intervals between retention operations, which may be expensive. Compression and deletion are performed by a single process, under a file-system file lock, twice in the lifetime of a log file: When it is closed (normal rotation) and when it exceeds the log file size rotation threshold as previously described. The operation is not process-specific, and is performed by whichever process that acquired the lock first.

In some cases, this behavior may cause the log archive size to exceed its size limit: If the archive directory size is close to the max archive size at the time of rotation, but still lower than the threshold, old log files will not be deleted. However, by the time the current log file has reached the threshold for rotation, the directory size may indeed exceed the threshold (at most by the threshold for rotation). This issue is dealt with by defining a retention safety interval: The retention procedure deletes old logs until the archive directory size is less than the threshold shown.

Figure 5:
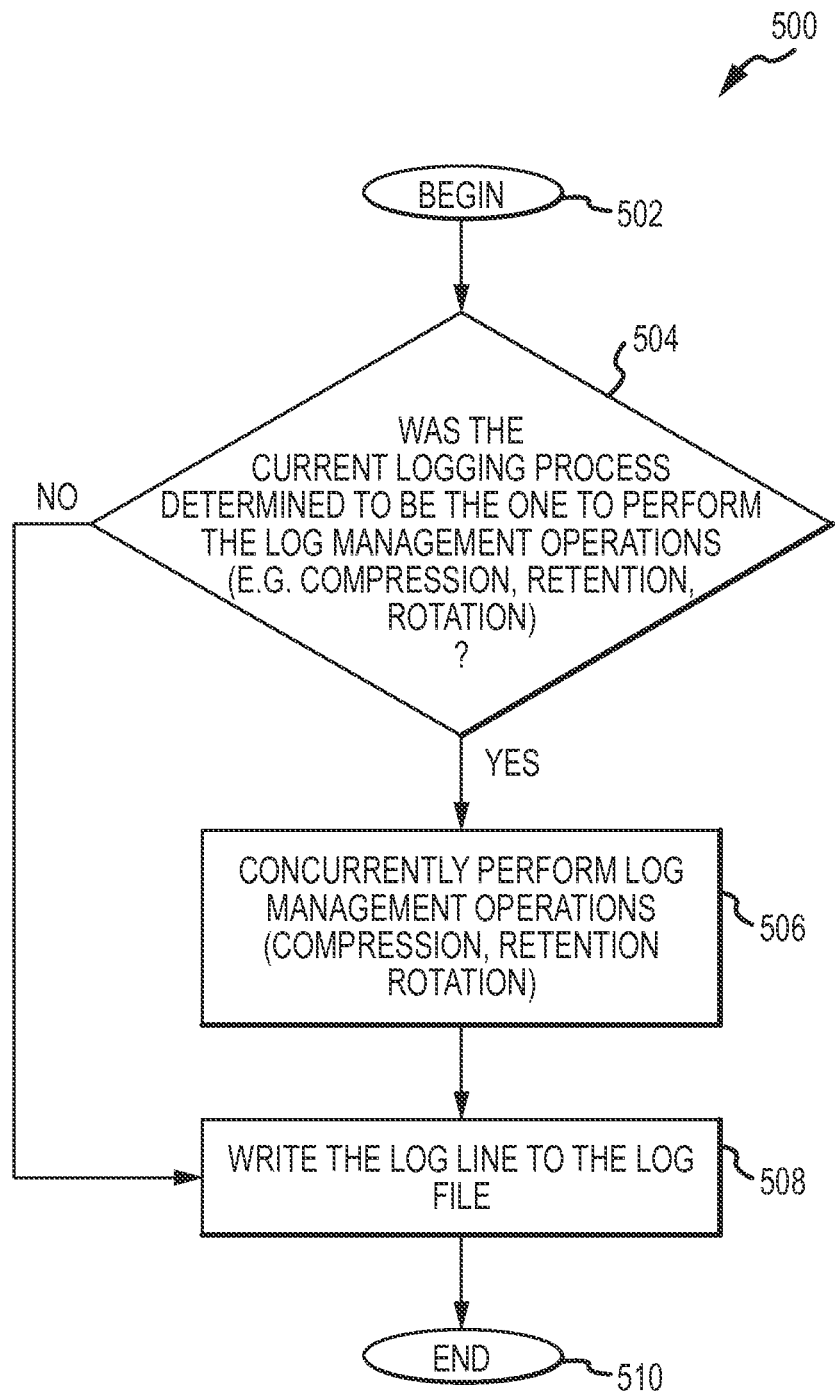
FIG. 5 is a flow chart diagram of an exemplary method for coordination of logging processes and log management according to one embodiment of the present invention.

FIG. 5 illustrates an exemplary method for coordinating logging and log management operations according to one embodiment of the present invention. Specific functionality pertaining to this method will later be described in the following figures. Method 500 begins (step 502) by querying whether the current logging process is determined to be the process to perform the log management operations (e.g., compression, retention, rotation) (step 504). If this is the case, concurrent with the performance and synchronization of the logging process (and potentially other logging processes), log management operations, including the aforementioned compression, retention, and rotation operations, are performed by a single process (step 506). The log line is then written to the log file (step 508). Returning to step 502, if the current logging process is not determined to be the process to perform the log management operations, the method 500 moves to step 508, where again, the log line is written to the log file. Again, specific functionality pertaining to these log management operations will be described, following in exemplary embodiments. The method 500 then ends (step 510).

Figure 6:
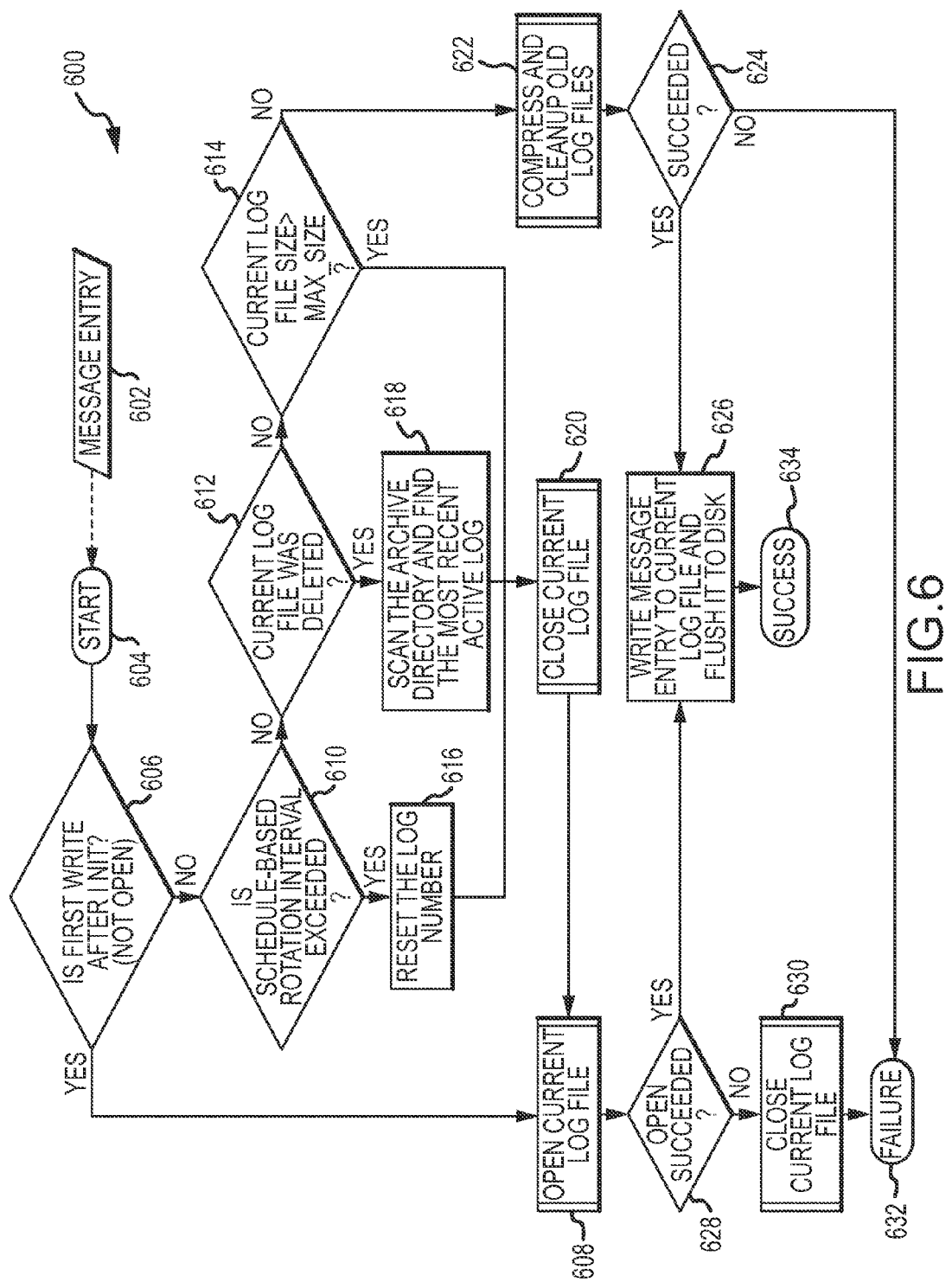
FIG. 6 is a flow chart diagram of an exemplary method for logging a new message entry, in which aspects of the present invention may be realized.

Returning to step 502 in reference to log processes, an exemplary procedure for logging a single log record entry may be as follows as shown in FIG. 6 as method 600 in one embodiment. Upon receive of a new record entry (step 602); the logging mechanism begins (step 604) by determining whether this is the first logged entry since the initialization of the mechanism (step 606). This means that the current active log file is not open yet. If so, then it means that the mechanism must open the current active log file (step 608). This is performed using the open current log file procedure described in the following paragraphs (FIG. 7, following).

If the logged entry is not the first logged entry after initialization, then one of the following is determined: If the time since the last schedule-based rotation has exceeded the schedule-based rotation interval (step 610), then the current log file numbering is reset (step 616), and the mechanism should move on to a new log file. This check is calculated using the last schedule-based rotation time together with the measured system time at the time of the check. If the current active log file has been deleted by another parallel process (probably performing rotation) (step 612), then the mechanism scans the archive directory in order to find the most recent active log file which shall be used to log this new record entry (step 618). If the current active log file has reached a log file max size, or subsequent to steps 616 and 618, the current log file is closed (step 620). All of the above cases indicate that the mechanism should perform log rotation, i.e. close the current log file and open a new one (again, step 608). Depending on the case, the new log file name and number shall be determined (this is described in the open current log file procedure again in FIG. 7, following).

Figure 7:
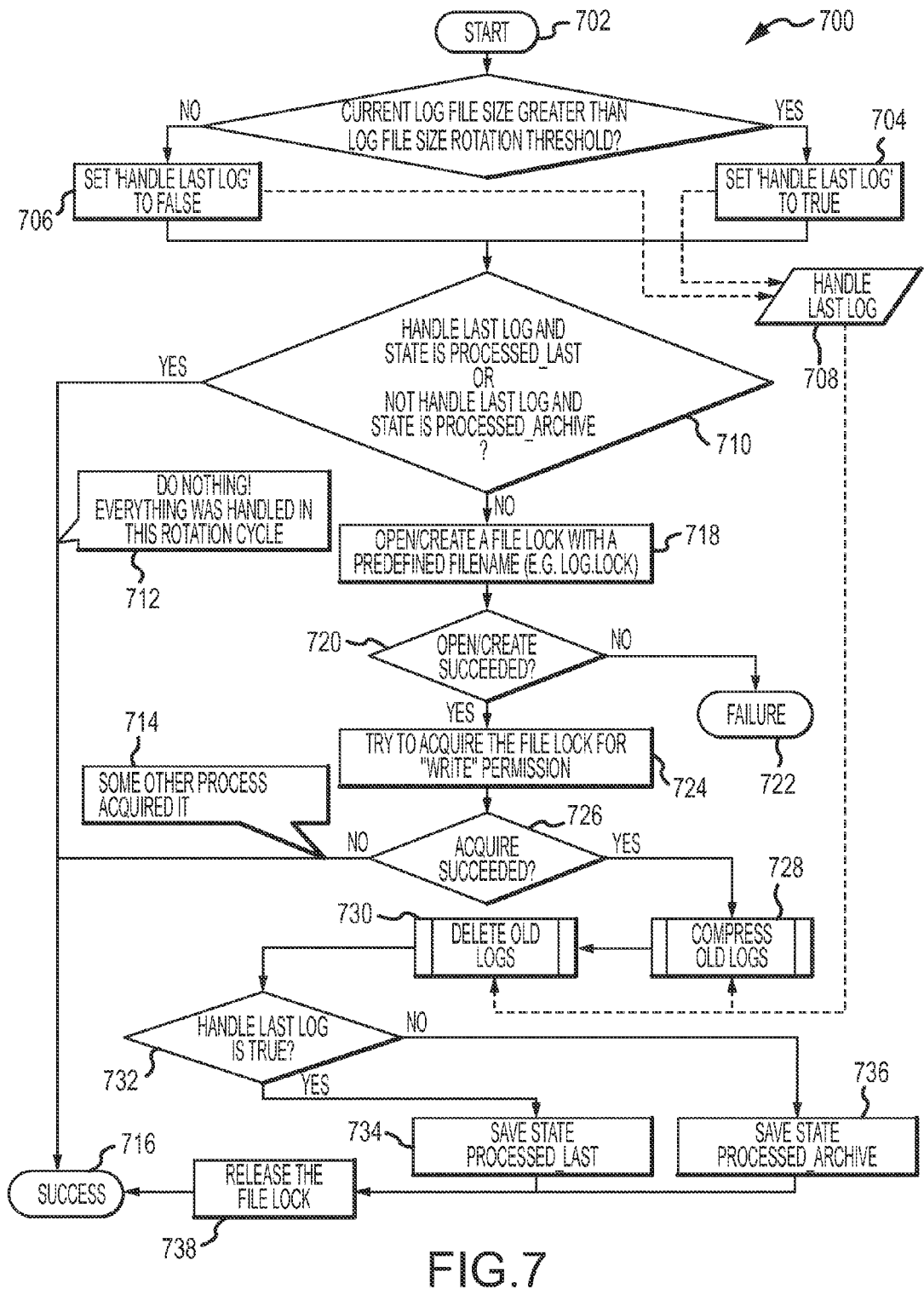
FIG. 7 is a flow chart diagram of an exemplary method for performing log compression, archival and cleanup operations, again in which aspects of the present invention may be realized.
Figure 9:
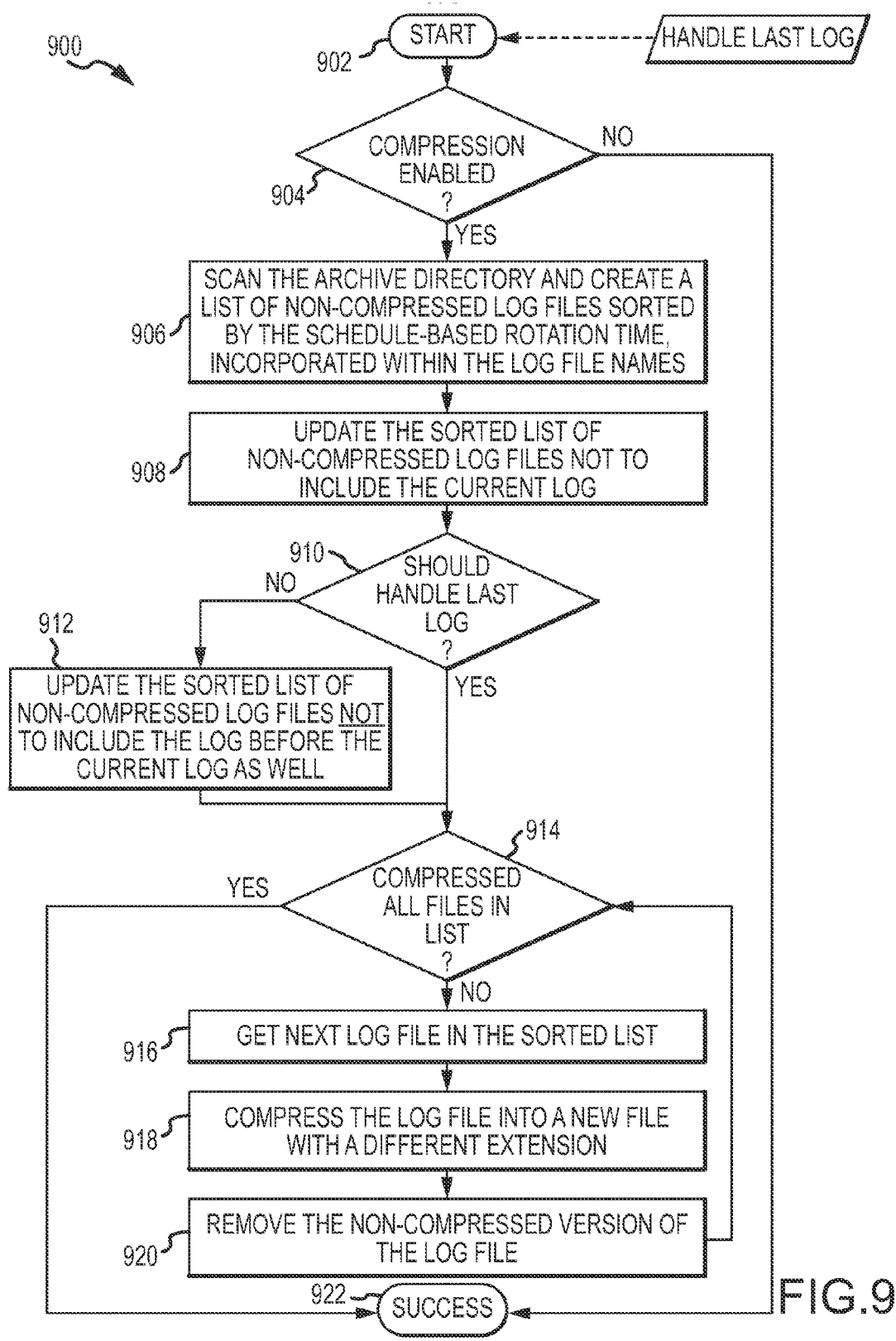
FIG. 9 is a flow chart diagram of an exemplary method for compressing old log files, again in which aspects of the present invention may be realized.
Figure 10:
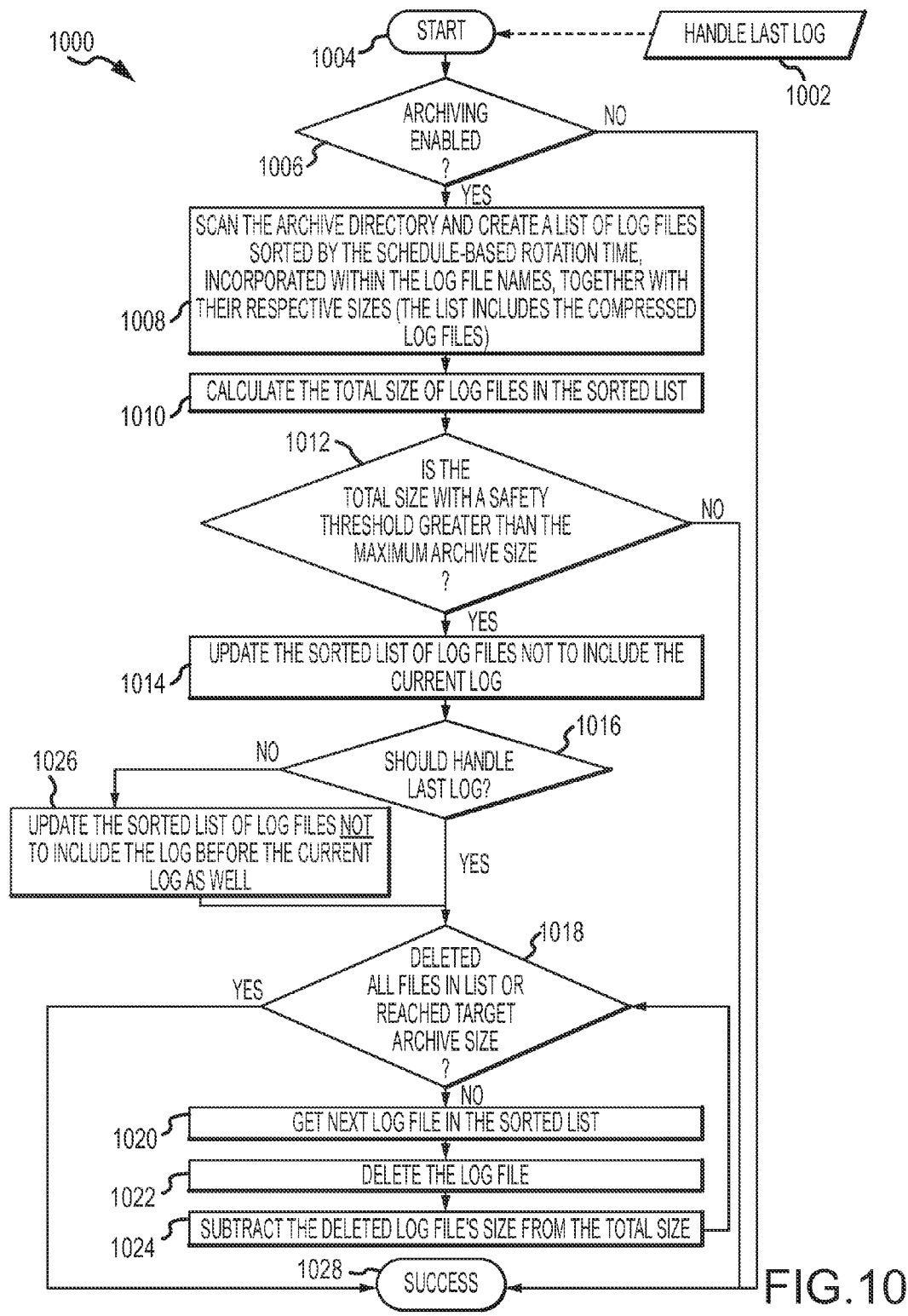
FIG. 10 is a flow chart diagram of an exemplary method for deleting old log files, again in which aspects of the present invention may be realized.

Returning to step 614, if none of the above cases occurred, then the mechanism moves on to perform the compress and cleanup old log files procedure (step 622) and described further in FIGS. 7 and 9, and 10. In any case of failure during one of the steps described above (step 624), the procedure fails (step 632), and the new log record is not logged (step 632). If succeeded (again, step 624), in any of the flows above, the mechanism continues to write the new log record entry to the current active log file at its end (step 626), using the operating system's line buffering mechanism (which avoids multiple lines interleaving with one another) (step 634).

Returning to step 608, and proceeding to step 628, if the open current log file procedure is not successful, the method 600 moves to step 630, where the current log file is closed, and the method 600 fails (again, step 632).

FIG. 7, following, illustrates an exemplary method 700 for performing log compression, archival, and cleanup operations, hereafter termed 'CompressAndCleanup'. Method 700 begins (step 702) by determining whether the last, previously active log in the archive directory should be handled in the procedure and its subsidiary procedures (step 703). Note that the most recent log is actually the current active log being written to.

If the current active log file size is greater than the log file size rotation threshold then the last log should be handled (e.g. handle last log is set to TRUE) (step 704). Otherwise, the last log should not be handled (e.g. handle last log is set to FALSE) (step 706). The handle last log flag is determined (step 708) based on the log file size rotation threshold, as described previously, which with a great deal of certainty ensures, that all other processes writing to the log mechanism have moved to write to the most recent log file. The method 700 then determines if either of the following: handle last log is TRUE together with the current state of the mechanism indicating PROCESSED_LAST, or handle last log is FALSE together with the current state of the mechanism indicating PROCESSED_ARCHIVE (step 710). If indeed so, then no compression, archiving, or cleanup should occur, as it was already taken care of, either by a parallel process performing the same procedure or by the active process in a previous call to this procedure (steps 712, 714). If not, then the procedure creates (or opens—it might have already been created by a parallel process) a file lock with a predefined filename (e.g. log.lock) (step 718). If it fails (step 720) to create such a file lock, then the procedure as a whole fails (step 722), as this is fundamental to the method 700 and cannot continue without it. However, it is expected that in most file-systems this situation should not occur.

The method 700 then tries to acquire the file lock for "write" permission in a non-blocking fashion, i.e. if the file lock is already acquired, then it returns immediately and indicates it, and if it is not already acquired, then it acquires it and continues to the next steps (step 724). If indeed the procedure could not acquire the file lock for "write" (step 726), then it means that some other parallel process, has already beat us to it (again, step 714), and acquired the file lock previously. Thus, the current running process should not continue with the compression, archive, and cleanup, and let the other parallel process complete the job. Hence, the method 700 exits without performing all the log management operations discussed (step 716).

However, if the procedure succeeded in acquiring the file lock for "write" (again, step 726), then it continues to the predefined procedures CompressOldLogs (step 728) and DeleteOldLogs (step 730) (in this order) and passes handle last log to these subsidiary procedures as an input. The detailed descriptions of predefined procedures CompressOldLogs and DeleteOldLogs shall follow in the next paragraphs (FIG. 9 and FIG. 10 respectively). Finally, the procedure updates the current state according to the handle last log (steps 732, 734, and 736). This is to indicate to future callers that the log compression, archiving, and cleanup was already performed and does not need to be re-executed. The state is reset upon moving to a new log file, as described in open current log file. Also, the procedure releases the file lock previously acquired (step 738) and moves to step 716 as shown.

Figure 8:
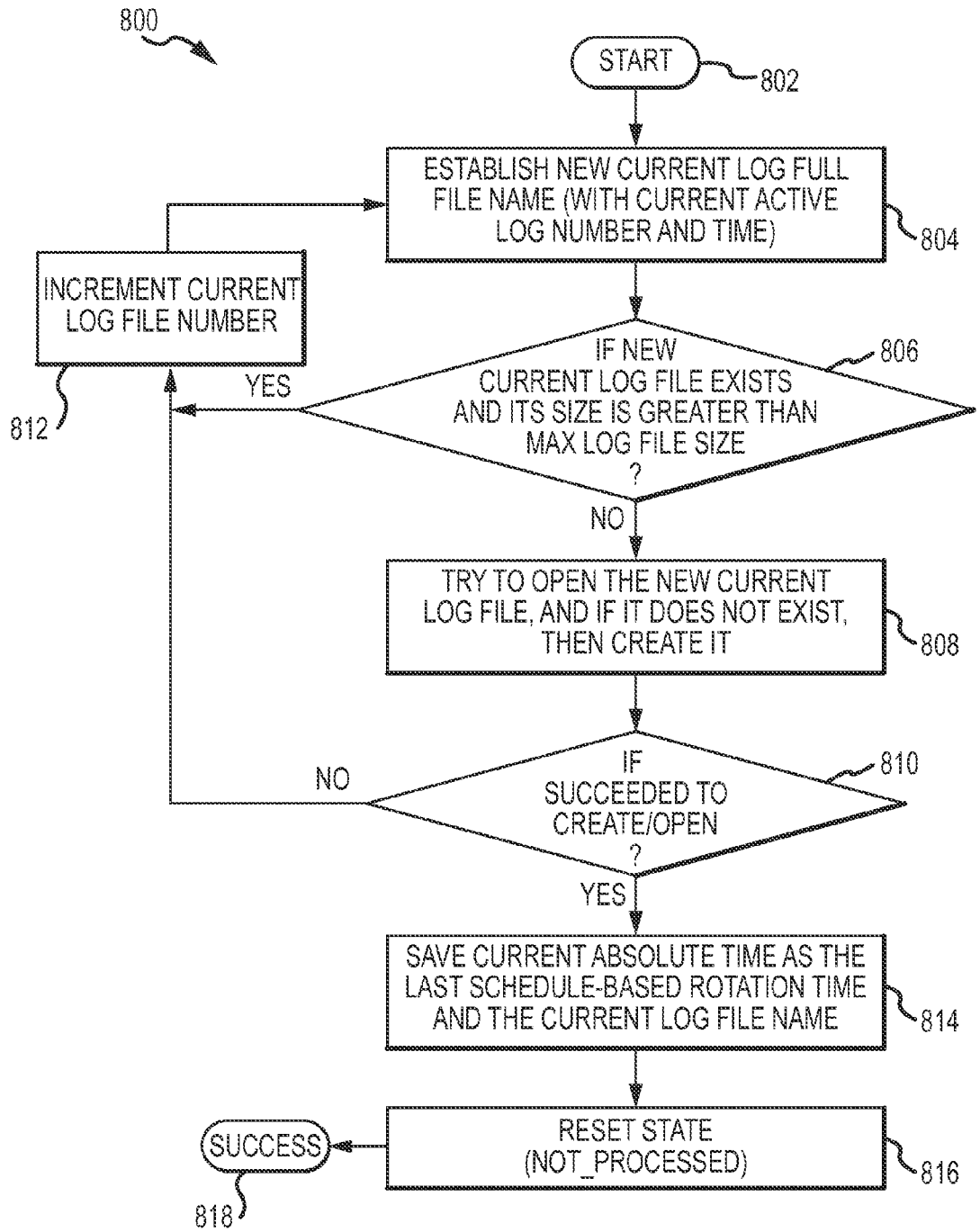
FIG. 8 is a flow chart diagram of an exemplary method for opening a current log file, again in which aspects of the present invention may be realized.

FIG. 8, following, illustrates an exemplary method 800 for opening a new log file as part of the log rotation, termed hereinafter as 'OpenNewLog'. Initially (step 802), the procedure increments the current running log file number, and then using this log file number, together with the basename and the last schedule-based rotation time forms the current log filename (this is described previously, an example is shown in FIG. 3) (step 804). If the established current log filename exists in the archive directory and its size is greater than the max log file size (step 806), then the method 800 re-iterates to form a newer one (steps 812, 804). Otherwise, if the established current log filename does not exist or it exists but has size less than the max log file size, the procedure should continue to the next steps.

If not, then the procedure tries to open the new current log file (step 808), and if it does not exist, then it creates it. This operation is assumed atomic, as modern file-systems support such creation. If the procedure could not do so (step 810), then some other process might have already engaged some log retention functions and as such, might have deleted the log file that is being attempted to open. Thus the current active process, should give up on this log file name, and re-iterate to form a newer log filename (again, steps 812, 804).

End steps: The procedure saves the last schedule-based rotation time (e.g. determined using the current absolute time aligned to the schedule-based rotation interval) and the current log filename (step 814) and resets its state (step 816). A new rotated log file has been opened (step 818).

FIG. 9, following, illustrates an exemplary method 900 for, in one embodiment, compressing old files in an archive directory as part of a log rotation and retention operation, and termed hereinafter 'CompressOldLogs.' Initially, the procedure checks if the mechanism was configured with compression enabled (step 904). If not, then it skips to the end and does nothing (step 922). Then, the procedure scans the archive directory and creates a list of non-compressed log files sorted by the schedule-based rotation time, incorporated within the log filenames (step 906). The procedure updates the sorted list of non-compressed log files not to include the current log file (step 908). This is to not disrupt any other processes that are currently logging to the most recent log file (current active log file).

If the input indicated not to handle the last log (the one previous the current active log) (step 910), then the procedure removes it from the sorted list of non-compressed log files as well (step 912). Then, the procedure iteratively compresses each log file from the sorted list into a new file with a different extension (to indicate a compressed log file) (steps 916 and 918) and removes the non-compressed version from the archive directory (step 920). When all the log files in the sorted list have been processed (step 914), the procedure ends (again, step 922).

Turning now to FIG. 10, an exemplary method 1000 for deleting old log files in an archive directory, as part of the log rotation and retention, named 'DeleteOldLogs' henceforth, is described. Initially, the method 1000 checks if the mechanism was configured with archiving enabled (step 1006). If not, then it skips to the end and does nothing (step 1028). Then, the method 1000 scans the archive directory and creates a list of log files sorted by the schedule-based rotation time, incorporated within the log filenames; together with their respective sizes (the list includes the compressed log files) (step 1008). Subsequently, the procedure calculates the total size of all the log files in the sorted list above (step 1010). If this total size summed with the safety threshold is less than the maximum archive size (step 1012), then method 1000 skips to the end and does nothing (step 1028).

Alternatively, method 1000 updates the sorted list of log files not to include the current log file (step 1014). This is intended to not disrupt any other processes that are currently logging to the most recent log file (current active log file). If the input indicated not to handle the last log (the one previous to the current active log) (step 1016), then method 1000 removes it from the sorted list of log files as well (step 1026). Then, the method 1000 iteratively deletes each log file from the sorted list and subtracts its size from the total size calculated previously (steps 1020, 1022, and 1024). When all the log files in the sorted list have been processed, or the total size has reached the target archive size (step 1018), the method 1000 ends (again, step 1028).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for coordinating event logging operations and log management by a processor device in a computing environment, the method, using the processor device, comprising:
    synchronizing a plurality of log processes, each independently performed in parallel with one another, into a single set of log files, wherein a line buffering mechanism of an operating system (OS) of the computing environment forecloses interleaving of the log processes; and
    concurrently performing log management operations by a single process protected by a file-system lock of the OS, the log management operations including each one of a log compression, log retention, and log rotation operation;
    wherein concurrently performing log management operations by a single process includes performing the log rotation in both a size-based and schedule-based manner;
    wherein performing the log rotation in both a size-based and schedule-based manner includes creating a new log file upon one of an excess of a maximum log file size and a rotation interval; and
    wherein creating the new log file further includes constructing a log filename having a plurality of attributes including at least one of a basename, last schedule-based rotation time, and log number, wherein the plurality of attributes do not change throughout a lifetime of the new log file.

2. The method of claim 1, further including implementing an open-file mechanism of the OS to prevent more than any one version of the new log file to be created.

3. The method of claim 2, further including preventing a previous log file from being one of compressed and deleted until an excess of a rotation threshold by a current log file.

4. The method of claim 3, further including, if the current log file exceeds the rotation threshold, deleting at least one of the previous log file and an available plurality of previous log files until a current archive size is less than a predetermined archive size derived from a target archive size factor and a retention safety interval.

5. A system for coordinating event logging operations and log management in a computing environment, comprising:
a processor device operable in the computing environment, wherein the processor:
synchronizes a plurality of log processes, each independently performed in parallel with one another, into a single set of log files, wherein a line buffering mechanism of an operating system (OS) of the computing environment forecloses interleaving of the log processes, and
concurrently performs log management operations by a single process protected by a file-system lock of the OS, the log management operations including each one of a log compression, log retention, and log rotation operation;
wherein concurrently performing log management operations by a single process includes performing the log rotation in both a size-based and schedule-based manner;
wherein performing the log rotation in both a size-based and schedule-based manner includes creating a new log file upon one of an excess of a maximum log file size and a rotation interval; and
wherein creating the new log file further includes constructing a log filename having a plurality of attributes including at least one of a basename, last schedule-based rotation time, and log number, wherein the plurality of attributes do not change throughout a lifetime of the new log file.

6. The system of claim 5, wherein the processor implements an open-file mechanism of the OS to prevent more than any one version of the new log file to be created.

7. The system of claim 6, wherein the processor preventing a previous log file from being one of compressed and deleted until an excess of a rotation threshold by a current log file.

8. The system of claim 7, wherein the processor, if the current log file exceeds the rotation threshold, deletes at least one of the previous log file and an available plurality of previous log files until a current archive size is less than a predetermined archive size derived from a target archive size factor and a retention safety interval.

9. A computer program product for coordinating event logging operations and log management by a processor device in a computing environment, the computer program product comprising a non-transitory computer-readable storage medium having computer-readable program code portions stored therein, the computer-readable program code portions comprising:
a first executable portion that synchronizes a plurality of log processes, each independently performed in parallel with one another, into a single set of log files, wherein a line buffering mechanism of an operating system (OS) of the computing environment forecloses interleaving of the log processes; and
a second executable portion that concurrently performs log management operations by a single process protected by a file-system lock of the OS, the log management operations including each one of a log compression, log retention, and log rotation operation;
wherein concurrently performing log management operations by a single process includes performing the log rotation in both a size-based and schedule-based manner;
wherein performing the log rotation in both a size-based and schedule-based manner includes creating a new log file upon one of an excess of a maximum log file size and a rotation interval; and
wherein creating the new log file further includes constructing a log filename having a plurality of attributes including at least one of a basename, last schedule-based rotation time, and log number, wherein the plurality of attributes do not change throughout a lifetime of the new log file.

10. The computer program product of claim 9, further including a fifth executable portion that implements an open-file mechanism of the OS to prevent more than any one version of the new log file to be created.

11. The computer program product of claim 10, further including a sixth executable portion that prevents a previous log file from being one of compressed and deleted until an excess of a rotation threshold by a current log file.

12. The computer program product of claim 11, further including a seventh executable portion that, if the current log file exceeds the rotation threshold, deletes at least one of the previous log file and an available plurality of previous log files until a current archive size is less than a predetermined archive size derived from a target archive size factor and a retention safety interval.

* * * * *